Oct. 3, 1950  N. F. YOUNG  2,524,246
GREENHOUSE BENCH BED
Filed Nov. 7, 1947
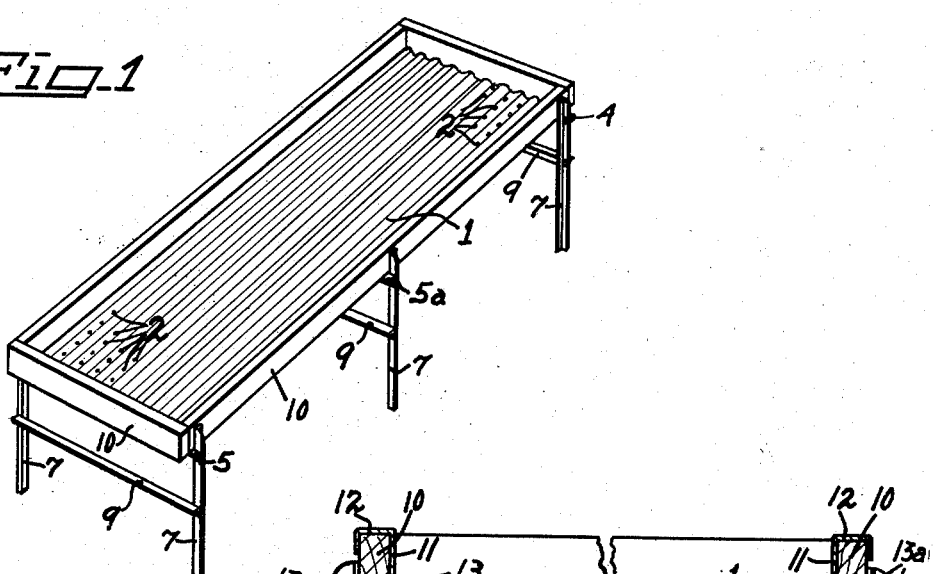
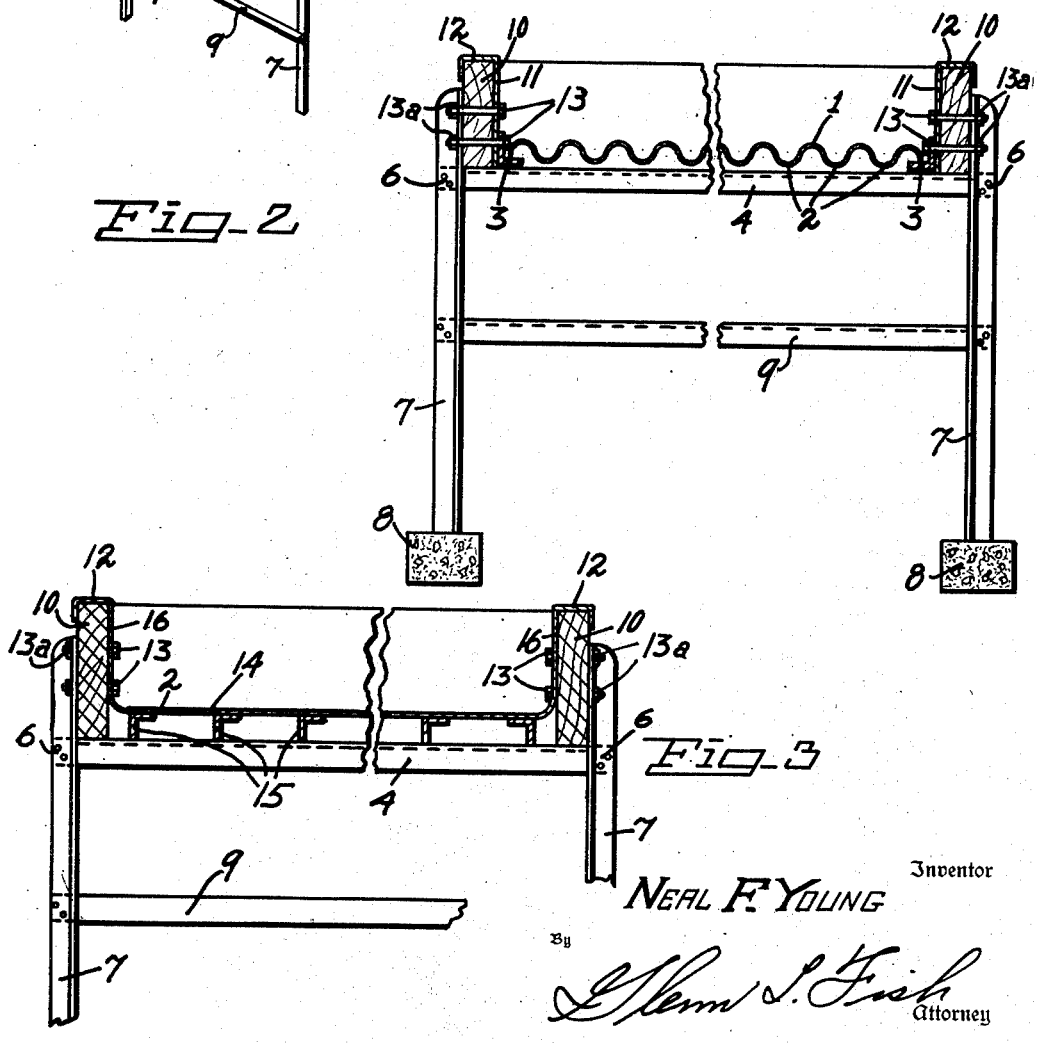
Neal F. Young, Inventor
By Glenn S. Fish, Attorney Patented Oct. 3, 1950

2,524,246

UNITED STATES PATENT OFFICE 2,524,246

GREENHOUSE BENCH BED

Neal F. Young, Veradale, Wash.

Application November 7, 1947, Serial No. 784,633

1 Claim. (Cl. 47—18)

My present invention relates to the general class of plant husbandry and hot beds, and more specifically to an improved greenhouse bench bed preferably made of metal bars and sheet metal to insure a rust proof and moisture proof structure that is well adapted for and efficient in conducting heat from the heat-conveying pipes to the soil contained in the bed.

While the supporting frame for the structure, and the bench bed, may be manufactured of various materials or metals, the bed is preferably made up of aluminum sheets that are light but strong, and characterized by smooth and non-porous surfaces that eliminate the harboring of plant pests; and the durable aluminum obviates the necessity for replacement of parts and repairs.

The greenhouse bench bed of my invention involves the use of a minimum number of parts that may with facility be manufactured at low cost of production, and the parts may be assembled with convenience to provide a structure of this type that is efficient in the performance of its functions and which may be maintained with comparatively low cost in operating expenses.

The invention consists essentially in certain novel features of construction and combinations and arrangements of parts as will hereinafter be described and more particularly set forth in the appended claim.

In the accompanying drawings I have illustrated a complete example of a physical embodiment of my invention in which the parts are combined and arranged in accord with one mode I have devised for the practical application of the principles of my invention. It will however be understood that changes and alterations are contemplated and may be made in these exemplifying drawings and mechanical structures, as is evidenced by the modified form of the invention, within the scope of my claim, and without departing from the principles of the invention.

Figure 1 is a perspective view of a greenhouse bench bed in which my invention is physically embodied; and Figure 2 is an enlarged vertical sectional view, transversely of the bench bed of Fig. 1.

Figure 3 is a view similar to Fig. 2, with parts broken away for convenience of illustration, showing a modified form of the bed.

In the form of the invention illustrated in Figs. 1 and 2 a rectangular sheet 1 of corrugated aluminum is employed as the bottom of the bed, and the bottom is provided with multiple holes or ports 2 for drainage of excess irrigation water from the contained soil; the upper channels formed by the corrugations being occupied by the lower portion of the bulk of soil, and the lower channels or outer corrugated surface of the bed bottom provide a maximum heating surface for transferring or conducting heat from the heating pipes usually located below the bottom of the bed to the soil within the bed, thus uniformly distributing the heat to the contents of the bed.

The rectangular bottom 1 that is fashioned in desired size is supported within the bench by means of two longitudinally extending angle bars 3, 3, which form side rails within the bench that are overlapped by the lateral edges of the bed bottom; and these side rails are supported in horizontal position by spaced cross bars 4, 5, and 5a, also of angle shape. The opposite ends of the cross bars, at 6, are each riveted to the upper end of an upright post or leg 7, and as indicated in the drawings, these legs are arranged in three pairs; each leg, if desired, being provided with a concrete foot as 8 in Fig. 2, or the lower ends of the legs may be embedded in a concrete floor as a permanent construction.

The legs form parts of a supporting frame for the bench, and the frame is braced to provide a rigid support as by means of cross bars 9, 9, 9, that are riveted at their opposite ends to the respective legs of a pair.

As a reinforcement for the bed and also the supporting frame, horizontally disposed boards, as 10, of wood may be supported on the upper cross bars 4, 5, and 5a, and these wood boards are separated from the soil content of the bench bed by means of upright aluminum lining sheets 11 within the bench, which are provided with flanges 12 that extend over the top edges of the boards.

The supporting frame and the bench bed are rigidly united by means of bolts 13 and nuts 13a, the bolts being passed through holes in flanges of the upright angle posts or legs, through the wood boards 10, and the lining or sheet covering 11 for the interior of the bench bed. Other bolts are passed through these enumerated parts and also through the side rails 3, 3 that support the bottom of the bed, and the nuts 13a securely clamp the parts together.

In the modified form of the invention illustrated in Fig. 3 a smooth sheet 14 of aluminum forms the bottom of the bed, and this bottom is reinforced and supported by parallel angle bars 15 rigidly united in suitable manner with the under side of the bottom, and the ends of the angle bars are supported on the cross bars 4, 5, and 5a of the supporting frame. The cover or interior lining for the bench bed is provided by means of upright walls 16, integral with the bottom 14, and these inner walls are provided with the top flanges 12 that overhang the wood boards 10.

In each illustrated form of the invention the bench bed is rigidly supported by the bolts 13 and clamped by the nuts 13a within the supporting frame, and the contained soil may be drained through the bottom holes or ports 2 of excess irrigating water; if however the contained soil is not of the type requiring drainage of irrigation, the drain ports may if desired be omitted.

When drainage is desirable the drain holes or ports are uniformly distributed throughout the bottom of the bed in order that the whole area of the soil may be drained thus preventing the accumulation of undesirable wet spots in the soil, that would affect the growing surface of the soil.

By this construction and arrangement of parts of the bench bed, and the use of aluminum, or similar metal in the construction of the bed, rotting caused by accumulated moisture is eliminated; the parts may be readily maintained in efficient condition, and replacements or repairs are obviated.

Having thus fully described my invention, what I claim as new and desire to secure by Letters Patent is:

In a greenhouse bench bed, the combination with a supporting frame including upright posts, upright wood walls, laterally spaced angle iron cross bars rigid with the posts, and laterally spaced longitudinally extending angle iron rails resting on the cross bars, of a corrugated aluminum bed-bottom having drainage ports and supported on the rails, interior aluminum inner lining walls covering the wood walls, said lining walls having integral flanges suspended over the upper edges of the wood walls and bolts rigidly uniting these walls and rails with the posts.

NEAL F. YOUNG.

REFERENCES CITED

The following references are of record in the file of this patent:

UNITED STATES PATENTS

| Number | Name | Date |
|---|---|---|
| 429,937 | Mitchell | June 10, 1890 |
| 602,649 | Wight | Apr. 19, 1898 |
| 1,618,999 | Roberts | Mar. 1, 1927 |
| 1,621,850 | Mettetal | Mar. 22, 1927 |